United States Patent [19]

Novobilski

[11] Patent Number: 5,139,546

[45] Date of Patent: Aug. 18, 1992

[54] NAIL VAPOR AND DUST COLLECTION AND TREATMENT DEVICE

[76] Inventor: Carl G. Novobilski, 2209 West Pinchot, Phoenix, Ariz. 85015

[21] Appl. No.: 709,894

[22] Filed: Jun. 4, 1991

[51] Int. Cl.$^5$ .................. B01D 50/00; B01D 46/12; B01D 53/04
[52] U.S. Cl. .......................... 55/316; 55/318; 55/356; 55/387; 55/471; 55/473
[58] Field of Search ............... 55/316, 318, 356, 387, 55/467, 471–473

[56] References Cited

U.S. PATENT DOCUMENTS

| | | | |
|---|---|---|---|
| 3,209,668 | 10/1965 | Haerter | 55/467 X |
| 3,422,263 | 1/1969 | Asahina | 55/467 X |
| 4,023,472 | 5/1977 | Grunder et al. | 55/467 X |
| 4,092,136 | 5/1978 | Zimbardi | 55/467 X |
| 4,148,618 | 4/1979 | Christenson et al. | 55/467 X |
| 4,252,547 | 2/1981 | Johnson | 55/316 X |
| 4,361,427 | 11/1982 | Barradas | 55/316 X |
| 4,385,911 | 5/1983 | Popeil et al. | 55/472 X |
| 4,526,592 | 7/1985 | Armbruster | 55/472 X |
| 4,531,956 | 7/1985 | Howorth | 55/472 X |
| 4,627,862 | 12/1986 | Frei et al. | 55/467 X |
| 4,647,295 | 3/1987 | Christ | 55/473 X |
| 4,900,344 | 2/1990 | Lansing | 55/467 X |
| 4,900,346 | 2/1990 | Lutz | 55/471 X |
| 4,917,713 | 4/1990 | Helmus | 55/473 X |
| 5,053,065 | 10/1991 | Garay et al. | 55/473 X |

FOREIGN PATENT DOCUMENTS 602807  8/1960  Canada .................. 55/316

Primary Examiner—Robert Spitzer
Attorney, Agent, or Firm—Kelly, Bauersfeld & Lowry

[57] ABSTRACT

A low profile nail vapor and dust collection and treatment device is provided for use in a manicuring and/or beauty salon environment. The device has a compact shape for use on a table of standard height, and includes a fan and filters for collecting and/or treating dustlike particulate and potentially toxic vapors at a manicurist work station.

13 Claims, 3 Drawing Sheets

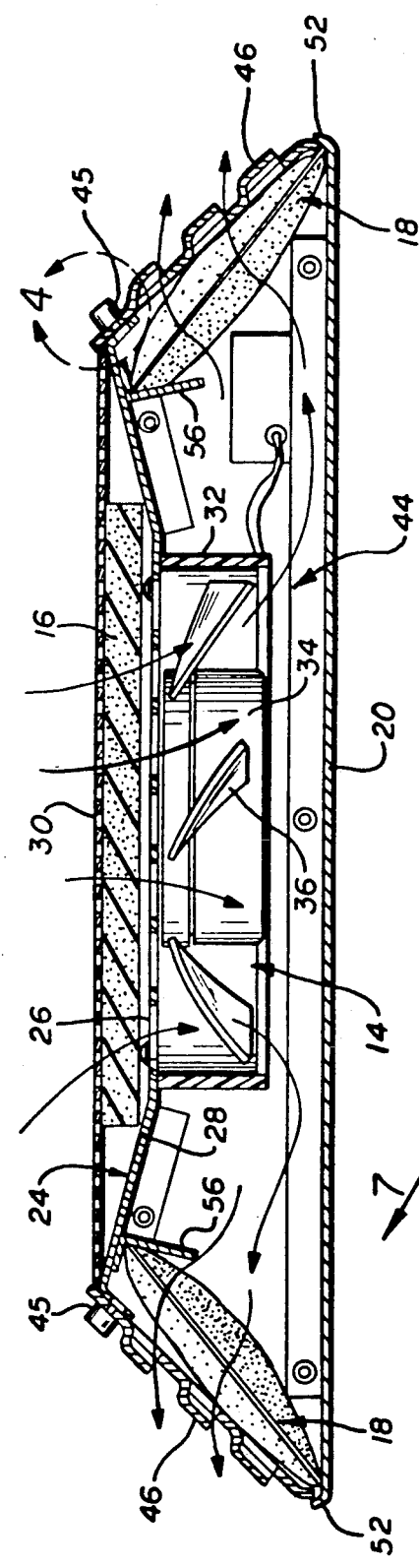
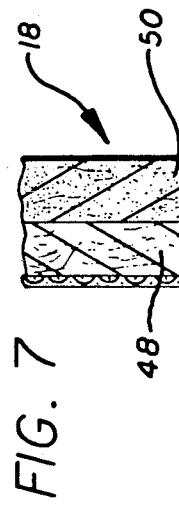
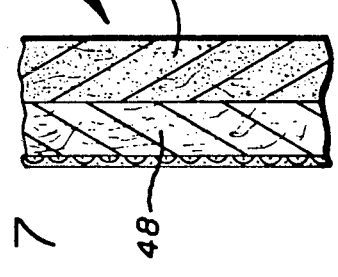
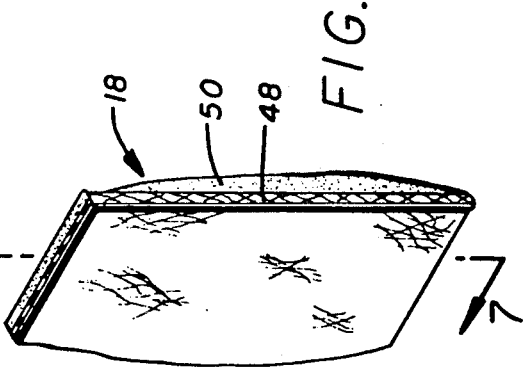
FIG. 3
FIG. 6
FIG. 7

NAIL VAPOR AND DUST COLLECTION AND TREATMENT DEVICE

FIELD OF THE INVENTION

The present invention relates generally to a filtering device that effectively aids in the collection and treatment of potentially harmful vapors and dust which occur during manicuring procedures. More specifically, this invention relates to a nail vapor and dust collection and treatment device for use in the manicuring and general beauty salon environment.

BACKGROUND OF THE INVENTION

In recent years, the impact of toxic materials and related disposal problems have become evident. In the work environment, concerns have been raised about occupational hazards.

One such occupational hazard in the manicuring and general beauty salon environment is the potentially harmful vapors and dust that are developed during the preparation and application of artificial nails, including acrylic nails, and during the filing and polishing of natural nails. The potentially harmful vapors are present in a variety of solvent-based substances commonly used in the manicuring and beauty salon environment in the form of cleaning agents, adhesives, filler substances, and/or polishes, etc.

Face masks have been used by manicuring personnel and occasionally by their clientele to avoid inhaling these vapors and dust. Face masks are, however, unsightly, uncomfortable, and undesirable in that they make conversation between the manicurist and client difficult.

Other filtering systems have been used but are generally obtrusive and noisy, and thus undesirable. Such systems include relatively large, air exhausted work stations in the form of a table having a work area in combination with exhaust fans and conduits for drawing air from the work area through appropriate filters and/or through an outside exhaust duct. However, these table type units are both large and costly, and often do not provide effective filtering of nail dust or treatment of harmful vapors.

Accordingly, there exists a need for a compact device for filtered collection of nail dust, and for treatment of potentially harmful vapors that are developed in the course of performing manicuring procedures. There is a further need for a table top and portable, low profile device that occupies a small amount of space, is relatively inexpensive, light in weight, quiet in operation so that conversation may proceed at normal voice levels, and allows work activity directly over the device at a comfortable height when placed on a standard table. The present invention fulfills these needs and provides further related advantages.

SUMMARY OF THE INVENTION

According to the present invention and exemplary embodiment thereof described herein, a nail vapor and dust collection and treatment device is provided for use in manicuring stations or other places where manicuring activities take place. The filtering device generally comprises a compact and low profile nail station housing adapted to be used on a table or desk top of standard height, and including means for collecting nail dust and treating potentially harmful vapors which are typically present in the course of performing manicuring procedures.

In a preferred embodiment, the nail station housing includes a horizontally open upper grille defining and underlying a work area, and disposed over a low profile fan unit for drawing dust and vapors downwardly into the nail station housing. A primary filter is positioned between the grille and the fan unit to trap a substantial majority of the generated nail dust. A plenum chamber is formed within the nail station housing beneath the fan unit, and opens bidirectionally to the housing exterior through a pair of exhaust vents at opposite ends of the housing. Secondary filters including activated carbon or other suitable treatment material are mounted at the inboard sides of the exhaust vents to further collect nail dust and to treat solvent vapors and the like.

The exhaust vents are defined by apertured vent plates, each held by a screw onto a downturned lip at each end of a housing support plate mounted over the top of the fan unit. The vent plates are thus easily removed for replacing the secondary filters. Upper edges of the vent plates protrude above the support plate and cooperate to retain the open upper grille in place. One or both vent plates may be removed to permit removal of the grille and thereby further permit access to the primary filter for replacement thereof.

Other features and advantages of the invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a longitudinal vertical sectional view taken generally on the line 3—3 of FIG. 2;

FIG. 6 is a perspective view of a preferred secondary filter for use in the invention;

FIG. 7 is a transverse vertical sectional view taken generally on the line 7—7 of FIG. 6.

DETAILED DESCRIPTION OF THE PREFERRED EMBODIMENT

Figure 1:
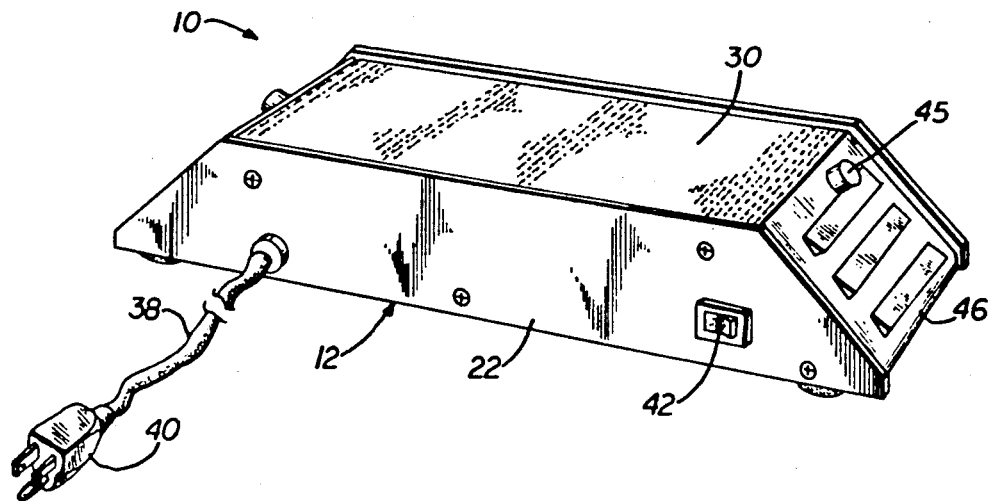
FIG. 1 is a perspective view of a nail vapor and dust collection and treatment device embodying the novel features of the invention.

As shown in the drawings for purposes of illustration, an improved nail vapor and dust collection and treatment device referred to generally in FIG. 1 by the reference numeral 10 is provided for collecting nail dust and for treating potentially harmful vapors which are or may be present at a manicurist's work station. The device is specifically designed to have a compact, low profile and portable configuration to permit use on the top of a desk or table of standard height.

In the working environment of a manicurist, substantial quantities of minute dust particulate is generated in the course of filing and shaping natural and/or artificial fingernails. In addition, a variety of solvent-based substances are typically present in the form of cleaning agents, adhesives, fillers, and/or polishes which include potentially harmful vapors. The present invention provides an inexpensive and easy to use device for effectively collecting and treating such dust and harmful vapors.

Figure 2:
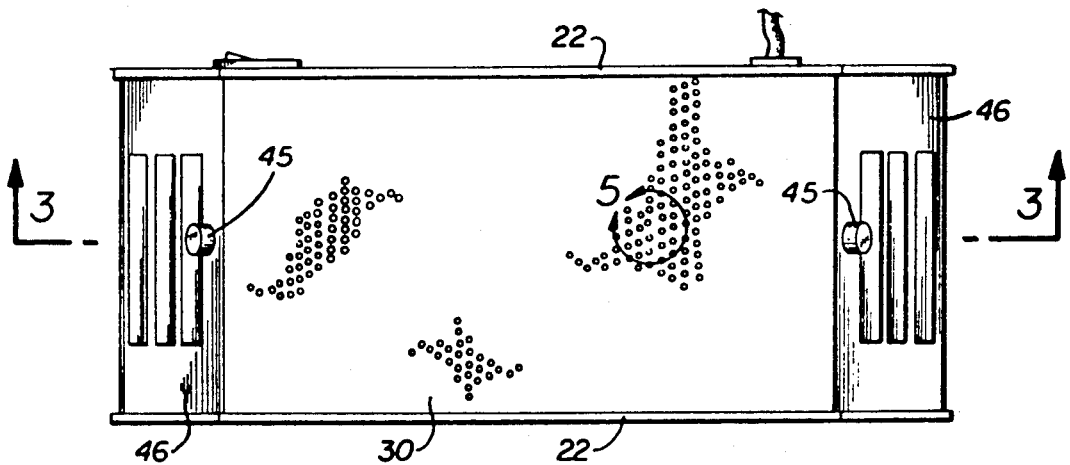
FIG. 2 is a top plan view of the device shown in FIG. 1.
Figure 4:
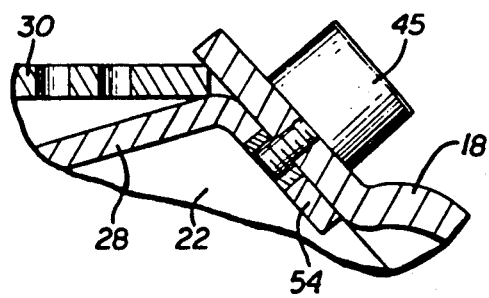
FIG. 4 is an enlarged fragmented vertical sectional view corresponding with the encircled region 4 of FIG. 3.
Figure 5:
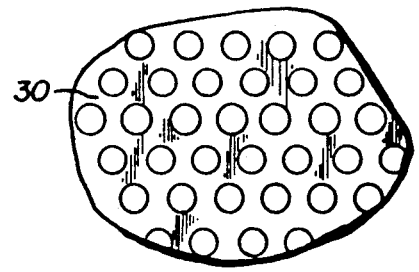
FIG. 5 is an enlarged fragmented plan view of the grille corresponding generally with the encircled region 5 of FIG. 2.

In accordance with the present invention, and as illustrated with respect to a preferred embodiment in FIGS. 1-3, the nail vapor and dust collection and treatment device generally comprises a nail station housing 12 encasing a low profile fan unit 14 for drawing air and entrained dust and solvent vapors through a primary filter 16 and a pair of secondary filters 18.

Figure 8:
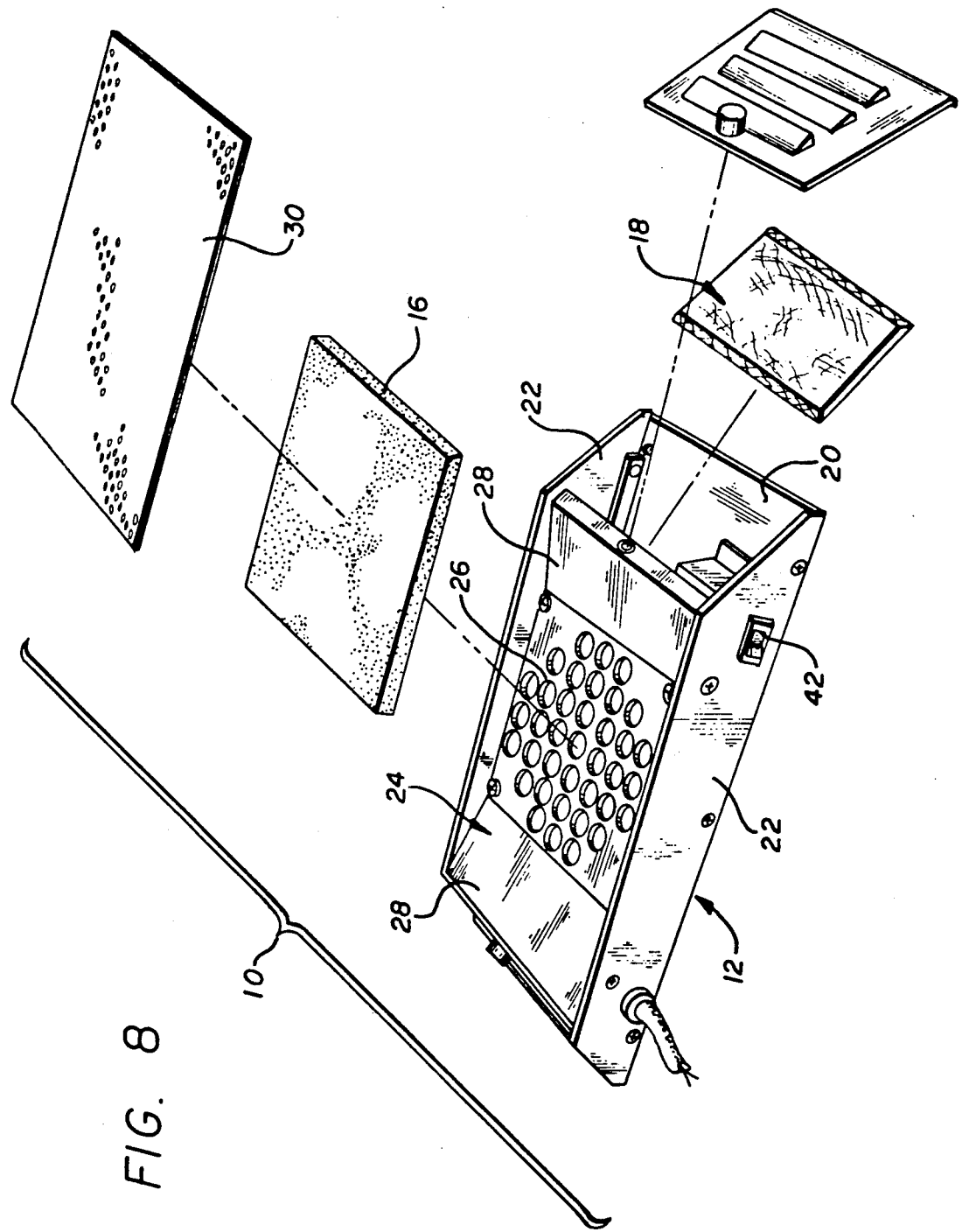
FIG. 8 is an exploded perspective view of the invention.

The nail station housing 12 has a bottom plate or wall 20 joined to a pair of relatively short upstanding side walls 22 which are connected in turn to and support an upper support plate 24. As shown best in FIGS. 3 and 8, the support plate 24 includes a generally horizontally oriented and perforated central section 26 defining an air inlet, and is joined at opposite ends to a pair of upwardly and outwardly inclined ramp sections 28. The outermost ends of these ramp sections 28 support a grille 30 of perforated construction in a position spaced above the support central section 26. The area over the grille 30 comprises a work area for the manicurist, with the housing 12 having a low profile configuration adapted to used on a table top of standard height while permitting the manicurist work to proceed at a normal and comfortable level.

The fan unit 14 is mounted to the underside of the support plate 24 at a position directly underlying the perforated central section 26. In a preferred form, the fan unit 14 comprises a fan housing 32 carrying a motor 34 and fan 36, all of which are low profile for drawing air from the work area in a direction downwardly through the grille 30. The primary filter 16 is interposed between the grille 30 and the support plate 24 to remove dust particles and the like from the air downflow. In this regard, the primary filter may be formed with any suitable construction adapted to entrap a substantial portion of the nail dust particles drawn therethrough. It may further be inpregnated with carbon. Moreover, electrical power for the fan motor 34 may be conveniently obtained from a suitable household power source (not shown) via a power cord 38 and plug 40, with an appropriate on-off switch 42 mounted on the housing exterior. Alternatively, an AC adaptor may be used.

As shown in FIG. 3, the fan housing 32 is spaced above the bottom wall 20 to define a plenum chamber 44 within the station housing 12. This plenum chamber leads in opposite directions to the opposite ends of the station housing to a corresponding pair of exhaust vents. During normal use, the manicurist and the client will sit on opposite sides of the station housing 12 in facing relation, such that the air exhausted bidirectionally from the opposite ends of the station housing will not blow onto either individual.

The secondary filters 18 are respectively seated at the opposite ends of the station housing 12 and are held in place at the inboard sides of a pair of apertured vent plates 46. As shown in FIGS. 6 and 7, a preferred construction for the secondary filters 18 comprises a combination of fibrous material 48 to entrap additional particles and dust, together with a solvent treatment material 50 for detoxifying the air flow by treating or otherwise removing toxic solvent vapors and the like from the air flow. One exemplary solvent treatment material comprises a fibrous mat bearing activated carbon particles.

The vent plates 46 are removably mounted to permit access to the primary filter 16 and the secondary filters 18. More specifically, each vent plate 46 has a lower edge adapted to seat inside an upturned rib 52 (FIG. 3) at the associated end of the bottom housing wall 20. An upper edge of the vent plate is seated against a downturned lip 54 at the end of the support plate 24. A fastener 45 such as a thumb turn screw fastens the vent plate 46 against the lip 54 thereby permitting easy vent plate mounting and removal to access the secondary filter 18 which is loosely rested against a transversely extending bracket 56 projecting downwardly from the support plate.

The upper edges of the two vent plates 46 project slightly above the downturned lips 54 at the opposite ends of the support plate 24. By shaping the housing 12 such that the vent plates 46 extend angularly upwardly and inwardly toward the grille 30, the upper edges of the vent plates 46 slightly overlie the opposite ends of the grille 30 to hold the grille in place. In this regard, it will be noted that the housing side walls 22 also extend slightly above the grille. The grille 30 is thus easily removed to permit access to and replacement of the primary filter 16 by removing one or both of the vent plates 46.

From the foregoing, it is to be appreciated that the above described nail vapor and dust collection and treatment device is low profile, attractive and very space-efficient, and effective in removing the harmful vapors and dust that are present in a beauty salon environment or wherever manicuring activities take place. The device thereby promotes a healthier environment for both the manicurist and client.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A nail vapor and dust collection and treatment device, comprising:

a housing defining an upwardly open air inlet and a pair of exhaust outlets at opposite ends of said housing;

fan means within the housing for drawing air into said housing via said air inlet and for discharging the air from said housing through said exhaust outlets;

a primary filter, supported by said housing at said air inlet, said housing including a perforated support plate defining said air inlet and supporting said primary filter, and further including a perforated grille and means for removably mounting said grille onto said housing in a position overlying said primary filter;

a pair of secondary filters supported by said housing respectively at said exhaust outlets; and a pair of vent plates removably mounted onto said housing at said exhaust outlets to extend angularly upwardly and inwardly with respect thereto, said vent plates being removable from said housing to permit access to said secondary filters, said means for removably mounting said grille comprising upper edges of said vent plates protruding upwardly and inwardly beyond said support plate to overlie opposite ends of said grille.

2. The device of claim 1 wherein said housing has a low profile configuration.

3. The device of claim 1 wherein said primary and secondary filters include a vapor treatment material.

4. The device of claim 3 wherein said vapor treatment material is activated carbon.

5. The device of claim 1 wherein said housing further defines a plenum chamber disposed below said fan means and communicating with said exhaust outlets.

6. A nail vapor and dust collection and treatment device, comprising;
- an elongated and relatively low profile housing having a bottom wall joined to a pair of upstanding side walls, and a perforated support plate connected between said side walls and defining an upwardly open air inlet, said side walls further cooperating with said bottom wall and said support plate to define a pair of exhaust outlets disposed generally at opposite ends of said housing;
- a low profile fan unit mounted within said housing to draw air into said housing through said air inlet, said housing further defining a plenum chamber below said fan unit, said plenum chamber communicating with said exhaust outlets;
- a primary filter supported on said support plate;
- a perforated grille;
- means for removably retaining said grille in a position overlying said primary filter;
- a pair of perforated vent plates removably mounted on said housing over said exhaust outlets to extend angularly upwardly and inwardly relative to said housing, said vent plates and said side walls having upper edges protruding above said support plate and cooperatively defining said means for retaining said grille; and
- a pair of secondary filters and means for supporting said secondary filters respectively at said exhaust outlets.

7. The device of claim 6 wherein said secondary filters each include a vapor treatment material.

8. A nail vapor and dust collection and treatment device, comprising;
- a housing defining an upwardly open air inlet and a pair of exhaust outlets at opposite ends of said housing;
- fan means within the housing for drawing air into said housing via said air inlet and for discharging the air from said housing through said exhaust outlets;
- a primary filter, supported by said housing at said air inlet, said housing including a perforated support plate defining said air inlet and supporting said primary filter, and further including a perforated grille and means for removably mounting said grille onto said housing in a position overlying said primary filter;
- a pair of secondary filters supported by said housing respectively at said exhaust outlets; and
- a pair of vent plates removably mounted onto said housing at said exhaust outlets, said vent plates being removable from said housing to permit access to said secondary filters, said housing including a bottom wall having upturned ribs at opposite ends thereof, and further wherein said support plate defines a pair of downturned lips at opposite ends thereof, said vent plates each having a lower edge adapted to seat inside an associated one of said upturned ribs and an upper edge adapted to rest against an associated one of said downturned lips.

9. The device of claim 8 further including fastener means for removably attaching said vent plates to said downturned lips.

10. The device of claim 9 wherein said fastener means comprises a thumb turn screw.

11. The device of claim 8 wherein said primary and secondary filters include a vapor treatment material.

12. The device of claim 11 wherein said vapor treatment material is activated carbon.

13. The device of claim 8 wherein said housing further defines a plenum chamber disposed below said fan means and communicating with said exhaust outlets.

* * * * *